(12) United States Patent
Ding

(10) Patent No.: US 9,292,722 B2
(45) Date of Patent: Mar. 22, 2016

(54) APPARATUS COMPRISING IMAGE SENSOR ARRAY AND ILLUMINATION CONTROL

(71) Applicant: Honeywell International, Inc., Morristown, NJ (US)

(72) Inventor: Yiwu Ding, Skaneateles, NY (US)

(73) Assignee: Honeywell International, Inc., Morristown, NJ (US)

( * ) Notice: Subject to any disclaimer, the term of this patent is extended or adjusted under 35 U.S.C. 154(b) by 31 days.

(21) Appl. No.: 14/153,213

(22) Filed: Jan. 13, 2014

(65) Prior Publication Data

US 2014/0124579 A1    May 8, 2014

Related U.S. Application Data

(63) Continuation of application No. 13/324,606, filed on Dec. 13, 2011, now Pat. No. 8,628,013.

(51) Int. Cl.
  *G06K 7/10* (2006.01)

(52) U.S. Cl.
  CPC .......... *G06K 7/10732* (2013.01); *G06K 7/1095* (2013.01)

(58) Field of Classification Search
  USPC ................. 235/455, 462.01–462.49
  See application file for complete search history.

(56) References Cited

U.S. PATENT DOCUMENTS

| | | |
|---|---|---|
| 5,019,699 A | 5/1991 | Koenck |
| 5,406,062 A | 4/1995 | Hasegawa et al. |
| 5,504,367 A | 4/1996 | Arackellian et al. |
| 5,541,419 A | 7/1996 | Arackellian |
| 5,572,006 A | 11/1996 | Wang et al. |
| 5,576,529 A | 11/1996 | Koenck et al. |
| 5,591,955 A | 1/1997 | Laser |
| 5,646,390 A | 7/1997 | Wang et al. |
| 5,648,650 A | 7/1997 | Sugifune et al. |
| 5,701,001 A | 12/1997 | Sugifune et al. |
| 5,756,981 A | 5/1998 | Roustaei et al. |
| 5,784,102 A | 7/1998 | Hussey et al. |
| 5,815,200 A | 9/1998 | Ju et al. |
| 5,877,487 A | 3/1999 | Tani et al. |
| 5,886,338 A | 3/1999 | Arackellian et al. |
| 6,010,070 A | 1/2000 | Mizuochi et al. |
| 6,230,975 B1 | 5/2001 | Colley et al. |
| 6,254,003 B1 | 7/2001 | Pettinelli et al. |
| 6,283,374 B1 | 9/2001 | Fantone et al. |
| 6,347,163 B2 | 2/2002 | Roustaei |
| 6,412,700 B1 | 7/2002 | Blake et al. |
| 6,669,093 B1 | 12/2003 | Meyerson et al. |
| 6,695,209 B1 | 2/2004 | La |
| 6,749,120 B2 | 6/2004 | Hung et al. |
| 6,832,725 B2 | 12/2004 | Gardiner et al. |
| 6,877,661 B2 | 4/2005 | Webb et al. |
| 7,061,395 B1 | 6/2006 | Bromer |
| 7,077,321 B2 | 7/2006 | Longacre, Jr. et al. |
| 7,083,097 B2 | 8/2006 | Toyama et al. |
| 7,083,098 B2 | 8/2006 | Joseph et al. |

(Continued)

*Primary Examiner* — Daniel Hess
(74) *Attorney, Agent, or Firm* — Additon, Higgins & Pendleton, P.A.

(57) ABSTRACT

There is set forth herein an indicia reading apparatus having a configuration in which an illumination assembly for projecting an illumination pattern is de-energized during subsequent exposure periods. In one embodiment the indicia reading apparatus includes a configuration in which the illumination assembly is energized intermediate of the exposure periods. The indicia reading apparatus is useful for reading decodable indicia that is displayed on a display.

14 Claims, 7 Drawing Sheets

(56) References Cited

U.S. PATENT DOCUMENTS

| | | |
|---|---|---|
| 7,185,817 B2 | 3/2007 | Zhu et al. |
| 7,219,843 B2 | 5/2007 | Havens et al. |
| 7,234,641 B2 | 6/2007 | Olmstead |
| 7,240,844 B2 | 7/2007 | Zhu et al. |
| 7,255,279 B2 | 8/2007 | Zhu et al. |
| 7,270,274 B2 | 9/2007 | Hennick et al. |
| 7,303,126 B2 | 12/2007 | Patel et al. |
| 7,308,375 B2 | 12/2007 | Jensen et al. |
| 7,320,431 B2 | 1/2008 | Zhu et al. |
| 7,336,197 B2 | 2/2008 | Ding et al. |
| 7,357,326 B2 | 4/2008 | Hattersley et al. |
| 7,387,250 B2 | 6/2008 | Mani |
| 7,398,927 B2 | 7/2008 | Olmstead et al. |
| 7,490,776 B2 | 2/2009 | Thuries |
| 7,490,778 B2 | 2/2009 | Zhu et al. |
| 7,503,499 B2 | 3/2009 | Zhu et al. |
| 7,513,430 B2 | 4/2009 | Zhu et al. |
| 7,516,899 B2 | 4/2009 | Laser |
| 7,527,207 B2 | 5/2009 | Acosta et al. |
| 7,533,824 B2 | 5/2009 | Hennick et al. |
| 7,568,628 B2 | 8/2009 | Wang et al. |
| 7,611,060 B2 | 11/2009 | Wang et al. |
| 7,656,556 B2 | 2/2010 | Wang |
| 7,693,744 B2 | 4/2010 | Forbes |
| 7,735,737 B2 | 6/2010 | Kotlarsky et al. |
| 7,762,464 B2 | 7/2010 | Goren et al. |
| 7,770,799 B2 | 8/2010 | Wang |
| 7,775,436 B2 | 8/2010 | Knowles et al. |
| 7,780,089 B2 | 8/2010 | Wang |
| 7,809,407 B2 | 10/2010 | Oshimia et al. |
| 7,810,720 B2 | 10/2010 | Lovett |
| 7,813,047 B2 | 10/2010 | Wang et al. |
| 7,909,257 B2 | 3/2011 | Wang et al. |
| 7,918,398 B2 | 4/2011 | Li et al. |
| 7,995,178 B2 | 8/2011 | Suguro et al. |
| 8,074,887 B2 | 12/2011 | Havens et al. |
| 8,628,013 B2 | 1/2014 | Ding |
| 8,636,215 B2 | 1/2014 | Ding et al. |
| 8,640,960 B2 | 2/2014 | Wang et al. |
| 8,777,108 B2 | 7/2014 | Coyle |
| 2002/0063160 A1* | 5/2002 | Krichever et al. ....... 235/462.32 |
| 2003/0062413 A1 | 4/2003 | Gardiner et al. |
| 2003/0222147 A1 | 12/2003 | Havens et al. |
| 2004/0020990 A1 | 2/2004 | Havens et al. |
| 2004/0164165 A1 | 8/2004 | Havens et al. |
| 2005/0001035 A1 | 1/2005 | Hawley et al. |
| 2005/0023356 A1 | 2/2005 | Wiklof et al. |
| 2005/0103854 A1 | 5/2005 | Zhu et al. |
| 2005/0279836 A1 | 12/2005 | Havens et al. |
| 2006/0011724 A1 | 1/2006 | Joseph et al. |
| 2006/0043194 A1 | 3/2006 | Barkan et al. |
| 2006/0113386 A1 | 6/2006 | Olmstead |
| 2006/0163355 A1 | 7/2006 | Olmstead et al. |
| 2006/0202036 A1 | 9/2006 | Wang et al. |
| 2007/0138293 A1 | 6/2007 | Zhu et al. |
| 2007/0181692 A1 | 8/2007 | Barkan et al. |
| 2007/0284447 A1 | 12/2007 | McQueen |
| 2008/0023556 A1 | 1/2008 | Vinogradov et al. |
| 2008/0223933 A1 | 9/2008 | Smith |
| 2009/0026267 A1 | 1/2009 | Wang et al. |
| 2009/0057413 A1 | 3/2009 | Vinogradov et al. |
| 2009/0072038 A1 | 3/2009 | Li et al. |
| 2009/0084847 A1 | 4/2009 | He et al. |
| 2009/0140050 A1 | 6/2009 | Liu et al. |
| 2010/0044436 A1 | 2/2010 | Powell et al. |
| 2010/0044440 A1 | 2/2010 | Wang et al. |
| 2010/0078477 A1 | 4/2010 | Wang et al. |
| 2010/0108769 A1 | 5/2010 | Wang et al. |
| 2010/0147956 A1 | 6/2010 | Wang et al. |
| 2011/0089244 A1 | 4/2011 | Barkan et al. |
| 2011/0101102 A1 | 5/2011 | Hussey et al. |
| 2011/0163165 A1 | 7/2011 | Liu et al. |
| 2011/0174880 A1 | 7/2011 | Li et al. |
| 2012/0000982 A1 | 1/2012 | Gao et al. |
| 2012/0111944 A1 | 5/2012 | Gao et al. |
| 2012/0138684 A1 | 6/2012 | Van Volkinburg et al. |
| 2012/0153022 A1 | 6/2012 | Havens et al. |
| 2012/0193429 A1 | 8/2012 | Van Volkinburg et al. |
| 2013/0001312 A1 | 1/2013 | Kearney et al. |
| 2013/0146665 A1 | 6/2013 | Havens et al. |
| 2013/0248604 A1 | 9/2013 | Coyle |

* cited by examiner

APPARATUS COMPRISING IMAGE SENSOR ARRAY AND ILLUMINATION CONTROL

CROSS-REFERENCE TO RELATED APPLICATIONS

The present application claims the benefit of U.S. patent application Ser. No. 13/324,606 for an Apparatus Comprising Image Sensor Array and Illumination Control filed Dec. 13, 2011 (and published Jun. 13, 2013 as U.S. Patent Publication No. 2013/0146666), now U.S. Pat. No. 8,628,013. Each of the foregoing patent application, patent publication, and patent is hereby incorporated by reference in its entirety.

FIELD OF THE INVENTION

The present invention relates in general to optical based apparatus, and particularly is related to an image sensor array based apparatus.

BACKGROUND

Imaging apparatus having image sensor arrays are available in a variety of forms, including digital cameras, mobile phones, surveillance equipment, medical diagnostic equipment, and indicia decoding apparatus. Imaging apparatus are available in forms with indicia decoding capability and without decoding capability. Imaging apparatus with indicia decoding capability can be regarded as indicia reading apparatus.

Indicia reading apparatus for reading decodable indicia are available in multiple varieties. For example, minimally featured indicia reading apparatus devoid of a keyboard and display are common in point of sale applications. Indicia reading apparatus devoid of a keyboard and display are available in the recognizable gun style form factor having a handle and trigger button (trigger) that can be actuated by an index finger. Indicia reading apparatus having keyboards and displays are also available, often in a form where a keyboard and display is commonly located by the providing of a touch screen type display. Keyboard and display equipped indicia reading apparatus are commonly used in retail, shipping and warehouse applications. In a keyboard and display equipped indicia reading apparatus, a trigger button for actuating the output of decoded messages is typically provided in such locations as to enable actuation by a thumb of an operator. Indicia reading apparatus in a form devoid of a keyboard and display or in a keyboard and display equipped form are commonly used in a variety of data collection applications including retail point of sale applications, retail inventory applications, shipping applications, warehousing applications, security check point applications, patient care applications, and personal use, common where keyboard and display equipped indicia reading apparatus is provided by a personal mobile telephone having indicia reading functionality. Fixed mount indicia reading apparatus are also commonly available, e.g., installed under or near a countertop at a point of sale. Some indicia reading apparatus are adapted to read bar code symbols including one or more of one dimensional (1D) bar codes, stacked 1D bar codes, and two dimensional (2D) bar codes. Other indicia reading apparatus are adapted to read OCR characters while still other indicia reading apparatus are equipped to read both bar code symbols and OCR characters.

SUMMARY

There is set forth herein an indicia reading apparatus having a configuration in which an illumination assembly for projecting an illumination pattern is de-energized during subsequent exposure periods. In one embodiment the indicia reading apparatus includes a configuration in which the illumination assembly is energized intermediate of the exposure periods. The indicia reading apparatus is useful for reading decodable indicia that is displayed on a display.

BRIEF DESCRIPTION OF THE DRAWINGS

The features described herein can be better understood with reference to the drawings described below. The drawings are not necessarily to scale, emphasis instead generally being placed upon illustrating the principles of the invention. In the drawings, like numerals are used to indicate like parts throughout the various views.

FIG. 5 is a timing diagram illustrating a method which can be performed by an indicia reading apparatus;

DETAILED DESCRIPTION

Figure 1:
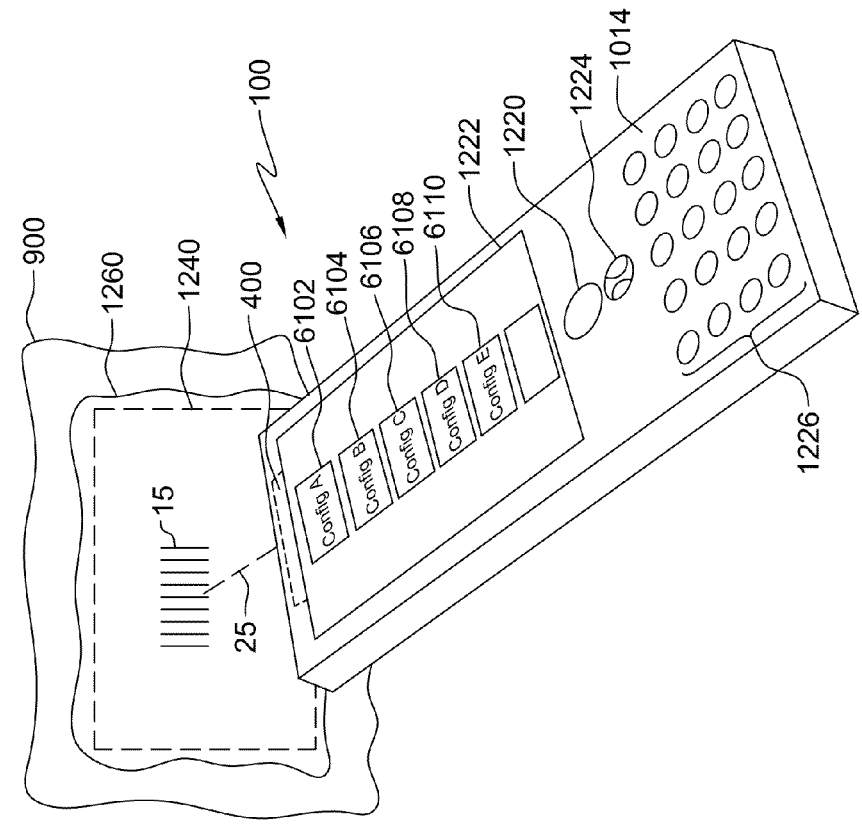
FIG. 1 is a schematic physical form view of an indicia reading apparatus in one embodiment illustrating the terminal in use for reading a displayed indicia.

There is set forth herein as shown in FIG. 1 an indicia reading apparatus 1000 having configuration in which an illumination assembly for projecting an illumination pattern 1260 is de-energized during exposure periods of subsequent first and second exposure periods and energized intermediate of the exposure periods. The configuration is useful for reading decodable indicia 15 (shown in FIG. 1 as a bar code symbol) that is displayed on a display 2222 of a target terminal 2000.

Figure 2:
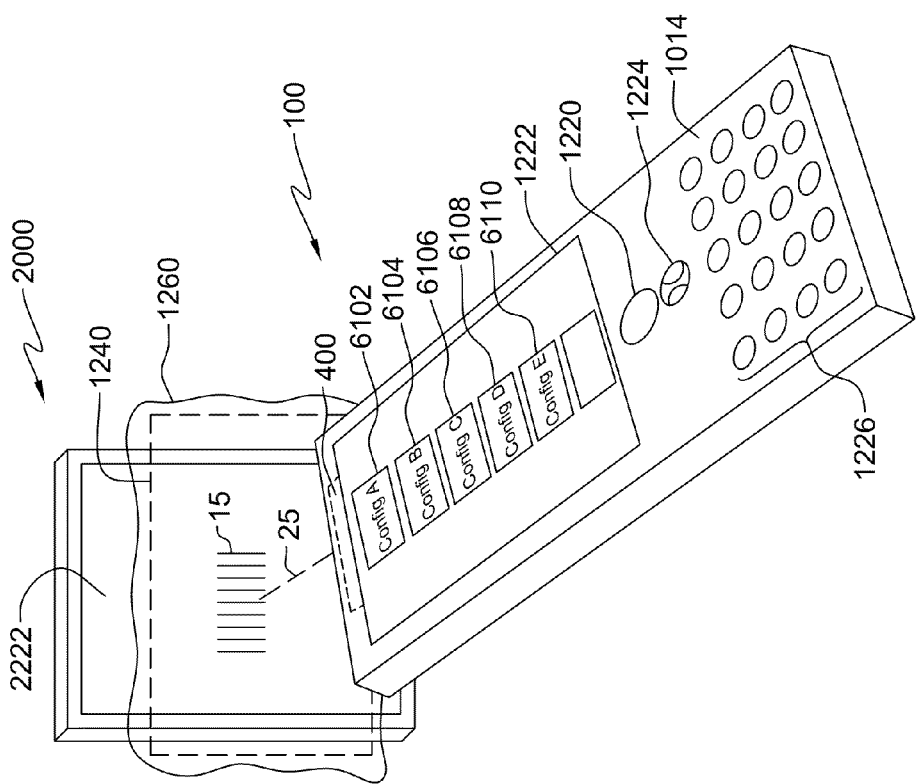
FIG. 2 is a schematic physical form view of an indicia reading apparatus in one embodiment in use for reading an indicia on a paper substrate.

The apparatus 1000 can be made available with other configurations. For example in another configuration, an illumination assembly for projecting an illumination pattern 1260 can be energized during subsequent exposure periods and de-energized intermediate the subsequent exposure periods. Such an alternative configuration renders apparatus 1000 well adapted for reading indicia disposed on a target, T (FIG. 3) provided by a target substrate other than a display 2222 of a target terminal 2000 as shown in FIG. 1, e.g., a paper substrate 900 as illustrated in FIG. 2.

An exemplary hardware platform for support of operations described herein with reference to an image sensor based indicia reading apparatus 1000 is shown and described with reference to FIG. 3.

Indicia reading apparatus 1000 can include an image sensor 1032 comprising a multiple pixel image sensor array 1033 having pixels arranged in rows and columns of pixels, associated column circuitry 1034 and row circuitry 1035. Associated with the image sensor 1032 can be amplifier circuitry 1036 (amplifier), and an analog to digital converter 1037 which converts image information in the form of analog signals read out of image sensor array 1033 into image information in the form of digital signals. Image sensor 1032 can also have an associated timing and control circuit 1038 for use in controlling e.g., the exposure period of image sensor 1032, gain applied to the amplifier 1036. The noted circuit components 1032, 1036, 1037, and 1038 can be packaged into a common image sensor integrated circuit 1040. Image sensor integrated circuit 1040 can incorporate fewer than the noted number of components. In one example, image sensor integrated circuit 1040 can be provided e.g., by an MT9V022 (752×480 pixel array) or an MT9V023 (752×480 pixel array) image sensor integrated circuit available from Micron Technology, Inc. In one example, image sensor array 1033 can be a hybrid monochrome and color image sensor array having a first subset of monochrome pixels without color filter elements and a second subset of color pixels having color sensitive filter elements. In one example, image sensor integrated circuit 1040 can incorporate a Bayer pattern filter, so that defined at the image sensor array 1033 are red pixels at red pixel positions, green pixels at green pixel positions, and blue pixels at blue pixel positions. Frames that are provided utilizing such an image sensor array incorporating a Bayer pattern can include red pixel values at red pixel positions, green pixel values at green pixel positions, and blue pixel values at blue pixel positions. In an embodiment incorporating a Bayer pattern image sensor array, CPU 1060 prior to subjecting a frame to further processing can interpolate pixel values at frame pixel positions intermediate of green pixel positions utilizing green pixel values for development of a monochrome frame of image data. Alternatively, CPU 1060 prior to subjecting a frame for further processing can interpolate pixel values intermediate of red pixel positions utilizing red pixel values for development of a monochrome frame of image data. CPU 1060 can alternatively, prior to subjecting a frame for further processing interpolate pixel values intermediate of blue pixel positions utilizing blue pixel values. An imaging assembly of apparatus 1000 can include image sensor 1032 and a lens assembly 200 for focusing an image onto image sensor array 1033 of image sensor 1032.

In the course of operation of apparatus 1000, image signals can be read out of image sensor 1032, converted, and stored into a system memory such as RAM 1080. A memory 1085 of apparatus 1000 can include RAM 1080, a nonvolatile memory such as EPROM 1082 and a storage memory device 1084 such as may be provided by a flash memory or a hard drive memory. In one embodiment, apparatus 1000 can include CPU 1060 which can be adapted to read out image data stored in memory 1080 and subject such image data to various image processing algorithms. Apparatus 1000 can include a direct memory access unit (DMA) 1070 for routing image information read out from image sensor 1032 that has been subject to conversion to RAM 1080. In another embodiment, apparatus 1000 can employ a system bus providing for bus arbitration mechanism (e.g., a PCI bus) thus eliminating the need for a central DMA controller. A skilled artisan would appreciate that other embodiments of the system bus architecture and/or direct memory access components providing for efficient data transfer between the image sensor 1032 and RAM 1080 are within the scope and the spirit of the invention.

Referring to further aspects of apparatus 1000, imaging lens assembly 200 can be adapted for focusing an image of decodable indicia 15 located within a field of view 1240 on a substrate, T, onto image sensor array 1033. A size in target space of a field of view 1240 of apparatus 1000 can be varied in a number of alternative ways. A size in target space of a field of view 1240 can be varied, e.g., by changing a terminal to target distance, changing an imaging lens assembly setting, changing a number of pixels of image sensor array 1033 that are subject to read out. Imaging light rays can be transmitted about imaging axis 25. Lens assembly 200 can be adapted to be capable of multiple focal lengths and multiple planes of optimum focus (best focus distances).

Apparatus 1000 can include an illumination assembly 800 for illumination of target, T, and projection of an illumination pattern 1260. Illumination pattern 1260, in the embodiment shown can be projected to be proximate to but larger than an area defined by field of view 1240, but can also be projected in an area smaller than an area defined by a field of view 1240. Illumination assembly 800 can include a light source bank 500, comprising one or more light sources. A physical form view of an example of an illumination assembly is shown in FIGS. 3-4. As shown in FIGS. 3-4, an imaging module 400 can be provided having a circuit board 402 carrying image sensor 1032 and lens assembly 200 disposed in support 430 disposed on circuit board 402. In the embodiment of FIGS. 3 and 4, illumination assembly 800 has a light source bank 500 provided by single light source 502. In another embodiment, light source bank 500 can be provided by more than one light source. Apparatus 1000 can also include an aiming assembly 600 for projecting an aiming pattern 1262. In the embodiment of FIG. 3, aiming pattern 1262 in the shape of a rectangle, but could be of another shape, e.g., a triangle, a cross. Aiming assembly 600 which can comprise a light source bank can be coupled to aiming light source bank power input unit 1208 for providing electrical power to a light source bank of aiming assembly 600. Power input unit 1208 can be coupled to system bus 1500 via interface 1108 for communication with CPU 1060.

Figure 3:
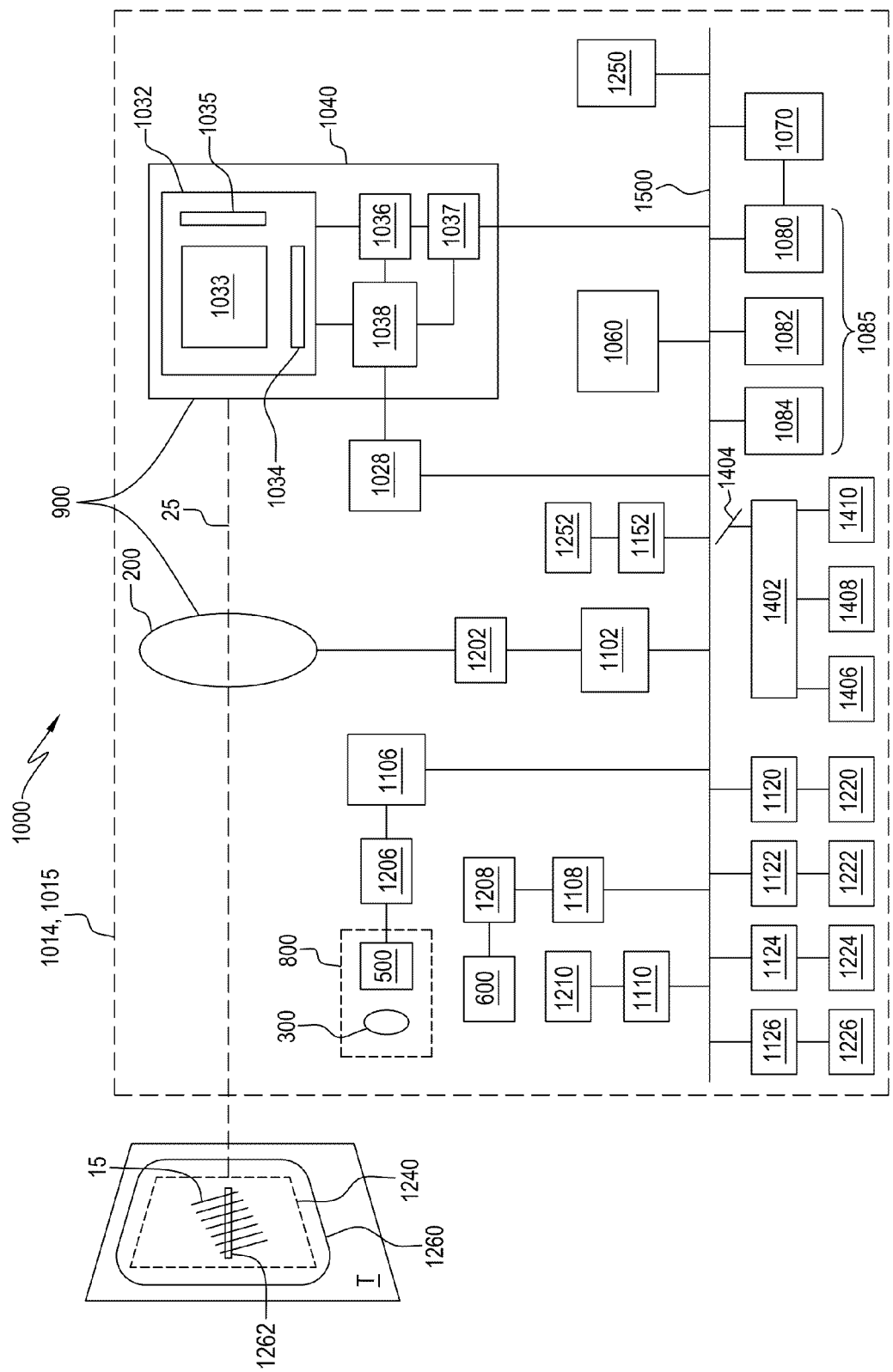
FIG. 3 is a block diagram of an indicia reading apparatus in one embodiment.
Figure 5:
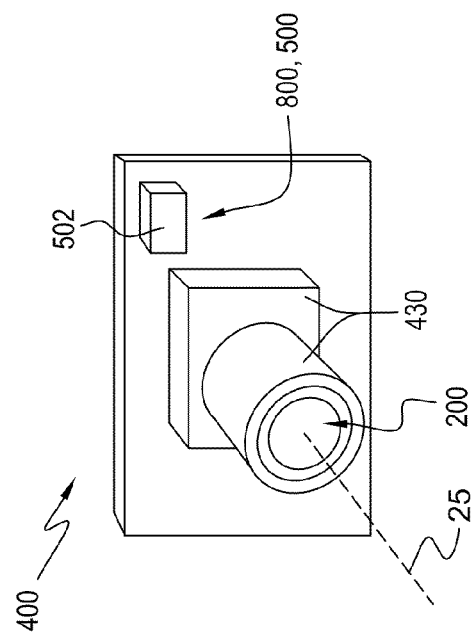
FIG. 5 is a perspective view of an imaging module.
Figure 4:
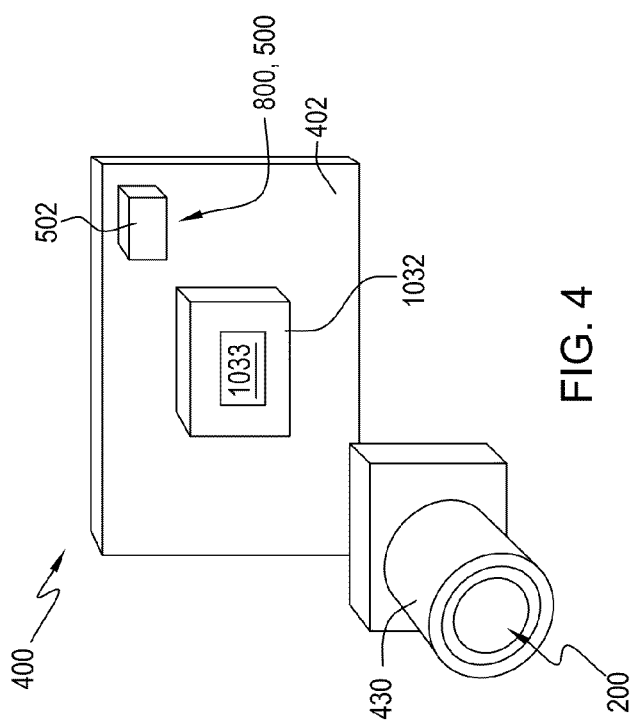
FIG. 4 is an exploded assembly perspective view of an imaging module.

In one embodiment, illumination assembly 800 can include, in addition to light source bank 500, an illumination lens assembly 300, as is shown in the embodiment of FIG. 3. In addition to or in place of illumination lens assembly 300 illumination assembly 800 can include alternative light shaping optics, e.g. one or more diffusers, mirrors and prisms. In use, apparatus 1000 can be oriented by an operator with respect to a target, T, bearing decodable indicia 15 in such manner that illumination pattern 1260 is projected on a decodable indicia 15. In the example of FIG. 3, target, T, can be provided by a paper substrate, e.g. a paper substrate of a package. In another example, a target, T, can be provided by another type of target substrate, e.g., a display 2222 of a target terminal 2000 as shown in FIG. 1. In the example of FIG. 3, decodable indicia 15 is provided by a 1D bar code symbol. Decodable indicia 15 could also be provided by a 2D bar code symbol or optical character recognition (OCR) characters. Referring to further aspects of apparatus 1000, lens assembly 200 can be controlled with use of electrical power input unit 1202 which provides energy for changing a plane of optimum focus of lens assembly 200. In one embodiment, an electrical power input unit 1202 can operate as a controlled voltage source, and in another embodiment, as a controlled current source. Electrical power input unit 1202 can apply signals for changing optical characteristics of lens assembly 200, e.g., for changing a focal length and/or a best focus distance of (a plane of optimum focus of) lens assembly 200. Light source bank electrical power input unit 1206 can provide energy to light source bank 500. In one embodiment, electrical power input unit 1206 can operate as a controlled voltage source. In another embodiment, electrical power input unit 1206 can operate as a controlled current source. In another embodiment electrical power input unit 1206 can operate as a combined controlled voltage and controlled current source. Electrical power input unit 1206 can change a level of electrical power provided to (energization level of) light source bank 500, e.g., for changing a level of illumination output by light source bank 500 of illumination assembly 800 for generating illumination pattern 1260.

In another aspect, apparatus 1000 can include power supply 1402 that supplies power to a power grid 1404 to which electrical components of apparatus 1000 can be connected. Power supply 1402 can be coupled to various power sources, e.g., a battery 1406, a serial interface 1408 (e.g., USB, RS232), and/or AC/DC transformer 1410).

Further regarding power input unit 1206, power input unit 1206 can include a charging capacitor that is continually charged by power supply 1402. Power input unit 1206 can be configured to output energy within a range of energization levels. An average energization level of illumination assembly 800 during exposure periods with the first illumination and exposure control configuration active can be higher than an average energization level of illumination and exposure control configuration active.

Apparatus 1000 can also include a number of peripheral devices including trigger 1220 which may be used to make active a trigger signal for activating frame readout and/or certain decoding processes. Apparatus 1000 can be adapted so that activation of trigger 1220 activates a trigger signal and initiates a decode attempt. Specifically, apparatus 1000 can be operative so that in response to activation of a trigger signal, a succession of frames can be captured by way of read out of image information from image sensor array 1033 (typically in the form of analog signals) and then storage of the image information after conversion into memory 1080 (which can buffer one or more of the succession of frames at a given time). CPU 1060 can be operative to subject one or more of the succession of frames to a decode attempt.

For attempting to decode a bar code symbol, e.g., a one dimensional bar code symbol, CPU 1060 can process image data of a frame corresponding to a line of pixel positions (e.g., a row, a column, or a diagonal set of pixel positions) to determine a spatial pattern of dark and light cells and can convert each light and dark cell pattern determined into a character or character string via table lookup. Where a decodable indicia representation is a 2D bar code symbology, a decode attempt can comprise the steps of locating a finder pattern using a feature detection algorithm, locating matrix lines intersecting the finder pattern according to a predetermined relationship with the finder pattern, determining a pattern of dark and light cells along the matrix lines, and converting each light pattern into a character or character string via table lookup.

Apparatus 1000 can include various interface circuits for coupling various of the peripheral devices to system address/data bus (system bus) 1500, for communication with CPU 1060 also coupled to system bus 1500. Apparatus 1000 can include interface circuit 1028 for coupling image sensor timing and control circuit 1038 to system bus 1500, interface circuit 1102 for coupling electrical power input unit 1202 to system bus 1500, interface circuit 1106 for coupling illumination light source bank power input unit 1206 to system bus 1500, and interface circuit 1120 for coupling trigger 1220 to system bus 1500. Apparatus 1000 can also include a display 1222 coupled to system bus 1500 and in communication with CPU 1060, via interface 1122, as well as pointer mechanism 1224 in communication with CPU 1060 via interface 1124 connected to system bus 1500. Apparatus 1000 can also include range detector unit 1210 coupled to system bus 1500 via interface 1110. In one embodiment, range detector unit 1210 can be an acoustic range detector unit. Various interface circuits of apparatus 1000 can share circuit components. For example, a common microcontroller can be established for providing control inputs to both image sensor timing and control circuit 1038 and to power input unit 1206. A common microcontroller providing control inputs to circuit 1038 and to power input unit 1206 can be provided to coordinate timing between image sensor array controls and illumination assembly controls. Apparatus 1000 can also include a wireless communication interface 1250 coupled to system bus 1500 and in communication with CPU 1060. In one embodiment, wireless communication interface 1250 can be provided by a Bluetooth wireless communication interface. Wireless communication interface 1250 can provide bi-directional data communication with one or more external processor equipped apparatus.

A succession of frames of image data that can be captured and subject to the described processing can be full frames (including pixel values corresponding to each pixel of image sensor array 1033 or a maximum number of pixels read out from image sensor array 1033 during operation of apparatus 1000). A succession of frames of image data that can be captured and subject to the described processing can also be "windowed frames" comprising pixel values corresponding to less than a full frame of pixels of image sensor array 1033. A succession of frames of image data that can be captured and subject to the described processing can also comprise a combination of full frames and windowed frames. A full frame can be read out for capture by selectively addressing pixels of image sensor 1032 having image sensor array 1033 corresponding to the full frame. A windowed frame can be read out for capture by selectively addressing pixels of image sensor 1032 having image sensor array 1033 corresponding to the windowed frame. In one embodiment, a number of pixels subject to addressing and read out determine a picture size of a frame. Accordingly, a full frame can be regarded as having a first relatively larger picture size and a windowed frame can be regarded as having a relatively smaller picture size relative to a picture size of a full frame. A picture size of a windowed frame can vary depending on the number of pixels subject to addressing and readout for capture of a windowed frame.

Apparatus 1000 can capture frames of image data at a rate known as a frame rate. A typical frame rate is 60 frames per second (FPS) which translates to a frame time (frame period) of 16.6 ms. Another typical frame rate is 30 frames per second (FPS) which translates to a frame time (frame period) of 33.3 ms per frame. A frame rate of apparatus 1000 can be increased (and frame time decreased) by decreasing of a frame picture size.

Figure 6:
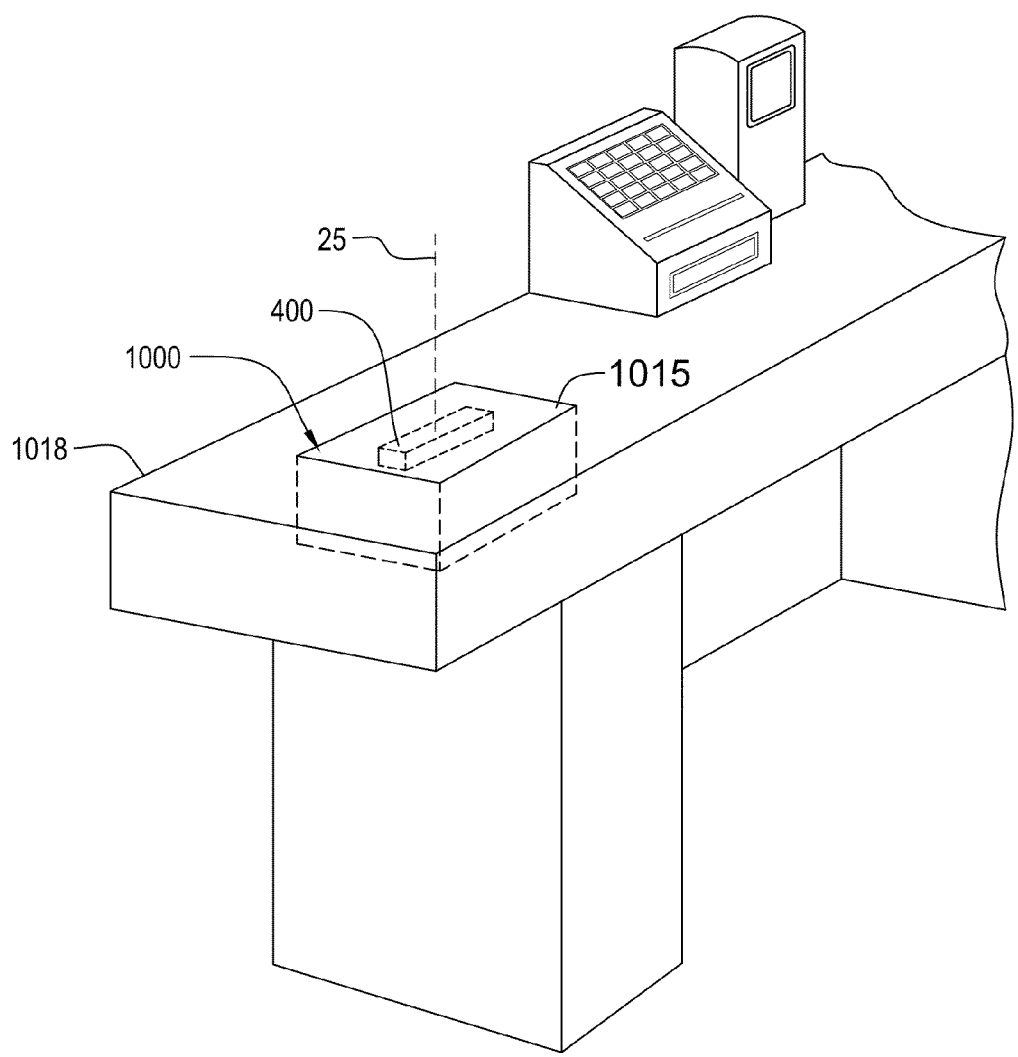
FIG. 6 is an implementation view of an indicia reading apparatus provided by a fixed mount indicia reading apparatus.

Further aspects of apparatus 1000 in one embodiment are described with reference again to FIGS. 1 and 2. Trigger 1220, display 1222, pointer mechanism 1224, and keyboard 1226 can be disposed on a common side of a hand held housing 1014 as shown in FIGS. 1 and 2. Display 1222 and pointer mechanism 1224 in combination can be regarded as a user interface of apparatus 1000. Display 1222 in one embodiment can incorporate a touch panel for navigation and virtual actuator selection in which case a user interface of apparatus 1000 can be provided by display 1222. A user interface of apparatus 1000 can also be provided by configuring apparatus 1000 to be operative to be reprogrammed by decoding of programming bar code symbols. A hand held housing 1014 for apparatus 1000 can in another embodiment be devoid of a display and can be in a gun style form factor. Imaging module 400 including image sensor array 1033 and imaging lens assembly 200 can be incorporated in hand held housing 1014. In the implementation view of FIG. 6 indicia reading apparatus 1000 having fixed mount housing 1015 and imaging module 400 incorporated in housing 1015 is shown as being disposed at a point of sale. Indicia reading apparatus 1000 in the implementation view of FIG. 6 is a fixed position and fixed mount indicia reading apparatus that is mounted at a checkout counter. Indicia reading apparatus 1000 having fixed mount housing 1015 can also be mounted e.g., at a ceiling above a conveyor belt. In one embodiment, apparatus 1000 can be devoid of a housing such as housing 1014 or housing 1015 and can be provided by imaging module 400. The components of apparatus 1000 depicted within dashed in border 1014, 1015 of FIG. 3 can be disposed in one or more of a hand held housing 1014 or a fixed mount housing 1015.

Figure 7:
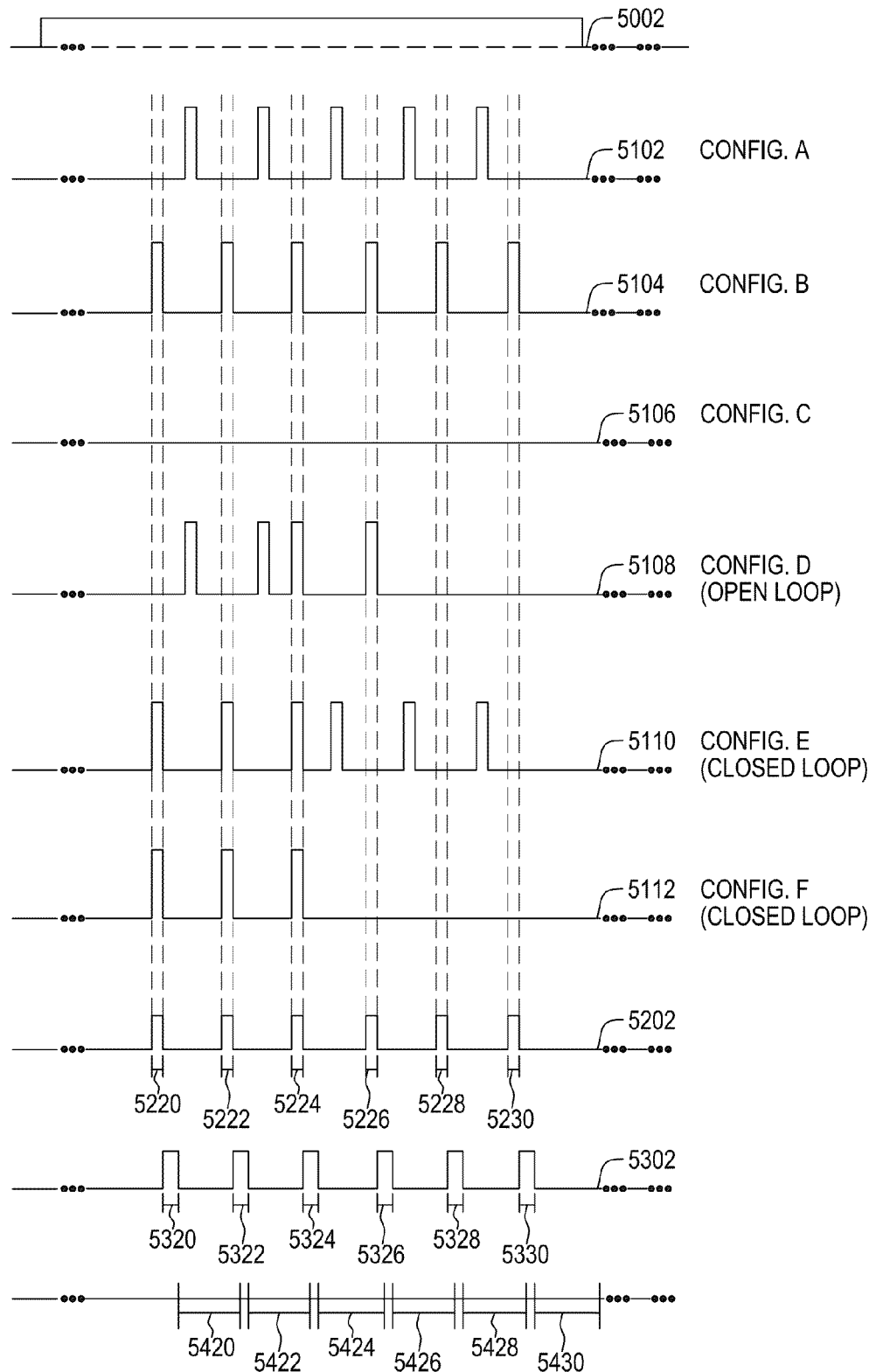
FIG. 7 is a timing diagram illustrating operation of an indicia reading apparatus.

A timing diagram illustrating operation of the apparatus 1000 during performance in accordance with various configurations set forth herein are indicated by flow diagram as shown in FIG. 7. Referring to the timing diagram of FIG. 7, signal 5002 is a trigger signal which can be made active, e.g., via actuation of trigger 1220, via powering up of apparatus 1000 or by receipt of a serial trigger command by apparatus 1000. Signal 5102 is an illumination energization level signal having varying energization levels. Signal 5202 is an exposure control signal having active states defining exposure periods and inactive states intermediate exposure periods. Signal 5302 is a readout control signal. When readout control signal 5302 is active, image signals can be read out of image sensor array 1033. Further regarding the timing diagram of FIG. 7, periods 5420-5430 are periods at which CPU 1060 can process frames of image data, e.g., for attempting to decode for decodable indicia. For frame=frame$_{N-2}$ period 5220 is the exposure period, period 5320 is the readout period and period 5420 is the processing period. For frame=frame$_{N-1}$ period 5222 is the exposure period, period 5322 is the readout period and period 5422 is the processing period. For frame=frame$_N$ period 5224 is the exposure period, period 5322 is the readout period and period 5422 is the processing period. For frame=frame$_{N+1}$ period 5226 is the exposure period, period 5326 is the readout period and period 5422 is the processing period. For frame=frame$_{N+2}$ period 5228 is the exposure period, period 5328 is the readout period and period 5428 is the processing period. For frame=frame$_{N+3}$ period 5230 is the exposure period, period 5330 is the readout period and period 5430 is the processing period. Apparatus 1000 can be operative so that prior to exposure period 5220 and after time $t_o$, apparatus 1000 can be capturing "parameter determination" frames that are processed for parameter determination and in some instances, not subject to decode attempt. For capture of parameter determination frames, apparatus 1000 can be operating in other than a first or second illumination exposure control configuration.

With configuration A an active, energization states of illumination assembly 800 can be as depicted by timeline 5102. Energization states of illumination assembly 800 with configuration A active can be characterized as follows. The energization state of illumination assembly 800 can de-energized during exposure periods 5220-5230 and energized intermediate of successive exposure periods 5220-5230.

Configuration A can be useful in an application in which a displayed decodable indicia is displayed on a display 2222 of a target terminal 2000 for reading by apparatus 1000. In one example, target terminal 2000 can be provided by a smart phone. In the development of apparatus 1000 it was determined that light projected by illumination assembly 800 of apparatus 1000 that is directed toward a display 2222 of target terminal 2000 tends to be either transmitted through the display 2222 or reflected from the display 2222 to potentially saturate image sensor array 1033 of apparatus 1000. Accordingly, for noise reduction it was determined that reading can be improved by de-energizing illumination assembly 5220-5230 during exposure periods 5220-5230. It was also determined in the development of apparatus 1000 that reading operation can be improved by energizing illumination assembly 800 intermediate of exposure periods so that illumination pattern 1260 is projected during exposure periods 5320-5330. It was determined in the development of apparatus 1000 that energizing illumination assembly 800 intermediate of exposure periods 5220-5230 can induce target terminal 2000 to operate in a high brightness mode. In a high brightness mode, it was determined in the development of apparatus 1000 that target terminal 2000 can increase a signal level of a signal provided by light emitted from display 2222 of target terminal 2000.

In the embodiment of Configuration A set forth in reference to the timing diagram of FIG. 7, a level of emitted illumination energy remains constant as illumination pattern 1260 is projected during successive illumination periods between frame exposure periods. In another embodiment, a level of emitted illumination energy can be increased between successive illumination periods. An energy level of emitted illumination can be increased by increasing one or more of a duration or an amplitude of emitted illumination. In one embodiment a level of emitted illumination energy emitted by illumination assembly 800 can be increased over subsequent illumination periods until a mode change of a display 2222 of a target terminal 2000 is detected and then in one embodiment can be regulated so that the emitted energy level is sufficient so that the induced mode change is maintained in an active state. Apparatus 1000 can be operative to detect whether high brightness mode has been induced by processing one or more captured frame of image data during one or more processing period, 5420-5430, e.g., by detecting whether a number of light to dark transitions of a frame has exceeded a threshold. The detection of light to dark transitions can be performed using samples lines (e.g. pixel values at rows or columns of pixel positions, pixel values along a diagonal line of pixel positions). In one embodiment a detection of light to dark transitions can be performed by calculating autocorrelation scores along sampling paths of a captured frame. An autocorrelation function for a sampling path can comprise the formula $$S_{path} = \Sigma(I_n - I_{n-1})^2 \qquad \text{Equation 1}$$

Where $I_n$ is the pixel value at a certain pixel position n, of a path, and $I_{n-1}$ is a pixel value at a pixel position adjacent to the $n^{th}$ pixel position. For reduction of clock cycles required for performing the calculation of Equation 1, an approximation of the result of Equation 1 can be carried out by executing the calculation:

$$S_{path} = \Sigma |I_n - I_{n-1}| \qquad \text{Equation 2}$$

A sharper image produced in a high brightness mode will produce a greater number of light and dark transitions. There is set forth herein an indicia reading apparatus wherein the indicia reading apparatus is operative to emit energy at an energy level sufficient to induce a mode change from a first mode to a second mode in target terminal displaying decodable indicia to be read, wherein the indicia reading terminal is further operative to detect whether the mode change has been induced, and wherein the indicia reading terminal is further operative to regulate the energy level of energy emitted by the indicia reading apparatus so that the second mode is maintained in the active state.

Configuration A can be made available with other configurations. Configuration B set forth herein is a configuration in which apparatus 1000 can be well adapted to read decodable indicia on a standard surface, e.g. paper. With configuration B active, illumination assembly 800 can be energized during exposure periods 5220-5230 so that illumination pattern 1260 is not projected during exposure periods 5220-5230 and de-energized intermediate exposure periods 5220-5230. The de-energizing of the illumination assembly 800 intermediate of exposure periods reduces power consumption of apparatus 1000. Timeline 5104 illustrates operation of illumination assembly 800 in accordance with configuration B.

Apparatus 1000 can operate in accordance with other configurations such as configuration C. With configuration C active, illumination assembly 800 can be de-activated during exposure periods but also can be maintained de-active intermediate of exposure periods 5220-5230. Configuration C is useful for reading displayed indicia but does not provide the advantage of Configuration A in the aspect of Configuration A being capable of inducing a low brightness mode of target terminal 2000. Timeline 5106 illustrates operation of illumination assembly 800 in accordance with configuration C.

In one embodiment, configurations as set forth herein are "fixed" configurations. Apparatus 1000 can be manufactured and provided to an end user so that the function of the apparatus 1000 does not vary from the function of a particular configuration e.g., one of configurations A, B, C, D, E, in the lifetime of the apparatus 1000. In another embodiment, the configurations set forth herein are dynamic configurations capable of change during the lifetime of the apparatus 1000 responsively to an operator input control. CPU 1060 can be operative to switch a presently active configuration responsively to a user input control. In one example, a user interface display 1222 can display various buttons 6102, 6104, 6106, 6108, 6110, 6112 corresponding to various configurations allowing an operator to actuate one configuration out of a plurality of configurations e.g., with use of pointer mechanisms 1224 or by actuation of a button in the case display 1222 is provided by a touch screen display. Apparatus 1000 can also be adapted so that an operator can input an alternative operator input control for selection of a configuration. The operator input control can be e.g., one or more of a serial command transmitted from an external computer and received by apparatus 1000 or a reading of a programming bar code symbol. The configurations A, B, C, D, E set forth herein are set forth as being configurations of imaging apparatus 1000. As specific operations of image sensor array 1033 correspond to each configuration, the configurations A, B, C, D, E can be regarded as configurations of illumination assembly 800.

In another aspect apparatus 1000 can be operative so that apparatus 1000 can sequentially operate in accordance with a first configuration and a second configuration. The sequential operation can be responsive to a trigger signal activation so that the apparatus operates sequentially in a first configuration to a second configuration during trigger signal activation period.

In one embodiment, apparatus 1000 can be operative to switch its configuration on an open loop basis independent of a sensed condition. In one embodiment, apparatus 1000 can be operative to switch its configuration on a closed loop basis responsively to a sensed condition.

An example of open loop switching is described with reference to timeline 5108. Apparatus 1000 can be operative to sequentially activate a predetermined sequence of configurations, each having a duration of one or more frame exposure capture and processing periods, responsively to an activation of a trigger signal. In the example of timeline 5108 of the timing diagram of FIG. 7 apparatus 1000 operates according to configuration A for two exposure capture and processing periods then switches to operating according to configuration B for two exposure capture and processing periods (illumination offset from exposure) and then switches to operating according to configuration C for two exposure capture and processing periods (illumination maintained de-energized). The configuration in which responsively to a trigger signal activation apparatus 1000 can operate according to configuration A B and C is itself a configuration which can be activatable by a input of a user input control, e.g., by selection of the button labeled D. Configuration D having corresponding button D of display 1222 can be regarded as the configuration "Dynamic open loop".

In one embodiment, apparatus 1000 can be operative to switch its configuration on a closed loop basis responsively to a sensed condition. Apparatus 1000 can be adapted so that a closed loop Configuration, as set forth herein can be activatable responsively to an operation input control, e.g., by selection of the button labeled E of display 1222. Referring to timeline 5110 a switching from operating in accordance with Configuration B to Configuration A in which apparatus 1000 is well suited to read decodable indicia displayed on a display can be responsive to sensed condition sensed by apparatus 1000. Referring to timeline 5112 a switching from operating in accordance with Configuration B to Configuration C in which apparatus 1000 is well suited to read decodable indicia displayed on a display can be responsive to sensed condition sensed by apparatus 1000. In one example, the sensed condition resulting in a configuration switch as explained with reference to the timelines of 5110 and 5112 can be the recognition of a set of spatial pattern features corresponding to a display equipped device by apparatus 1000 processing of one or more frames of image data such as the one or more frames having frame exposure periods 5220, 5222, 5224. In the development of apparatus 1000 it was determined that many types of display equipped apparatus, e.g. target terminal 2000 utilized for displaying decodable indicia to be read have a set of signature features. For example the common smart phone form factor has been observed to have the following signature characteristics: an inner relatively sharp edged rectangle (the display) surrounded by an outer rectangle (the outer border of the housing). On processing of a frame of image data to recognize a display equipped apparatus provided by a smart phone, apparatus 1000 can dynamically switch configurations e.g., from B to A as indicated by timeline or from B to C as indicated by timeline 5112. There is set forth herein an indicia reading apparatus that switches a configuration responsively to a sensed condition, wherein the sensed condition is the detection of display equipped apparatus, e.g. target terminal 2000 in the field of view of the imaging assembly by processing of one or more frames captured by the apparatus for recognition of one or more spatial patterns indicative of a display equipped apparatus, e.g. target terminal 2000 provided by a smart phone.

Figure 9:
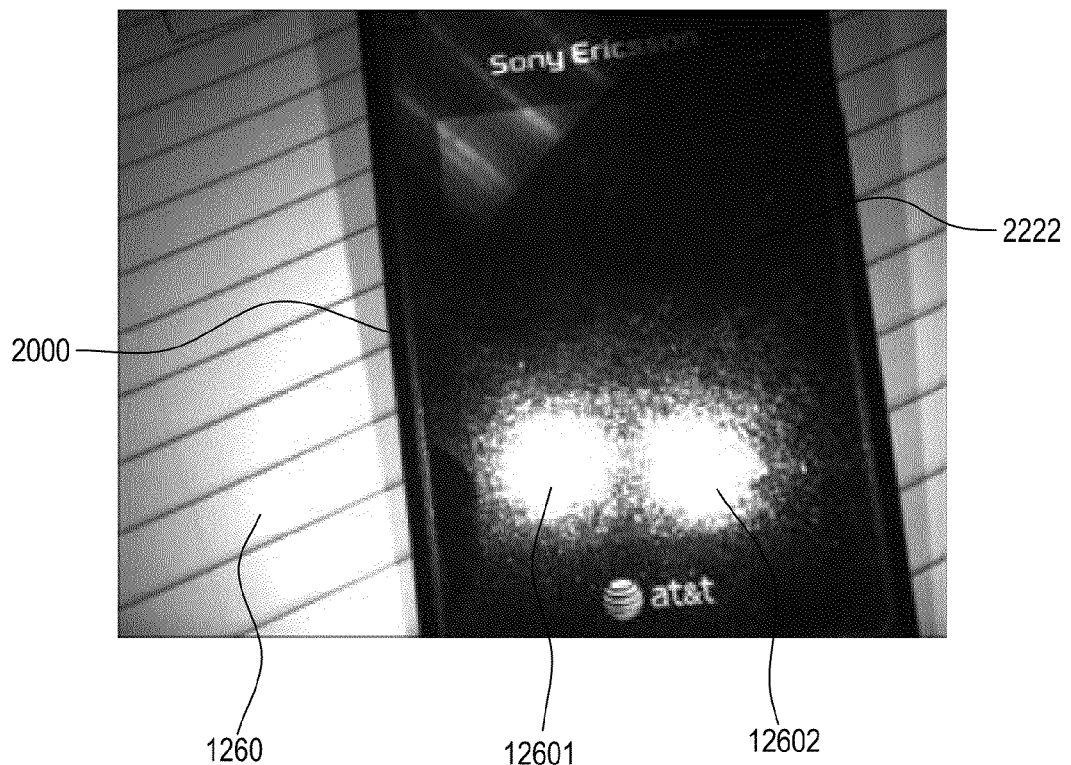
FIG. 9 is representation of an illumination pattern reflected from a display.
Figure 10:
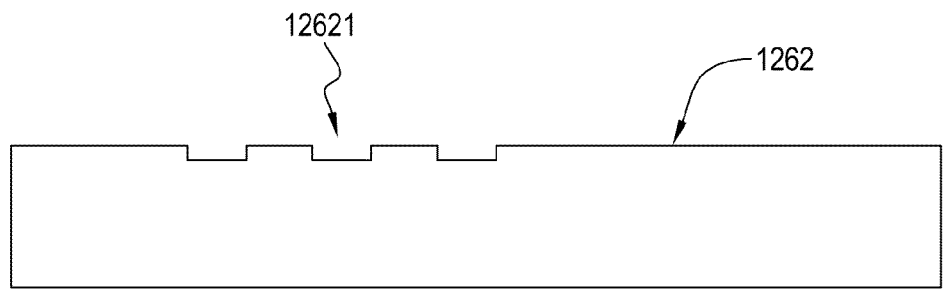
FIG. 10 is a representation of an aiming pattern reflected from a display.

In one example, the sensed condition resulting in a configuration switch as explained with reference to the timelines of 5110 and 5112 can be a recognition of a set of spatial pattern features corresponding to a light pattern such as illumination pattern 1260 or aiming pattern 1262 (FIG. 3) on a highly reflective surface such as a display 2222 of a target terminal 2000 as shown in FIG. 1. In the development of apparatus 1000 it was determined that light patterns projected by apparatus 1000, when projected on a highly reflective surface such as a display 2222 of a target terminal 2000, have different spatial qualities than when projected on a less reflective surface. For example, a diffusely projected illumination pattern 1260 as seen in FIGS. 2 and 3 when projected onto a paper substrate as shown in FIGS. 2 and 3 can have hot spots 12601 12602 as shown in FIG. 9 when projected on a reflective surface such as a display 2222 of a target terminal 2000. Hot spots 12601 and 12602 can be recognizable by application of image processing pattern recognition methods executable by processor, e.g. CPU 1060. In the embodiment of FIG. 3, aiming pattern 1262 is in the shape of a rectangle when projected on a paper substrate. However, apparatus 1000 can be adapted so that when pattern 1262 is projected on a highly reflective surface such as a display, additional recognizable features 12621 are recognizable by virtue of pattern 1262 being reflected with additional resolution when reflected by a highly reflective surface, e.g. a display 2222 or a target terminal 2000. Additional features 12621 can be recognizable by application of image processing pattern recognition methods executable by processor, e.g. CPU 1060. Accordingly, a recognition of a rectangle having dimensions of aiming pattern 1262 and including features 12621 can result in a configuration switch as set forth herein. For capture of a frame of image data representing aiming pattern 1262, aiming assembly 600 can be energized for projection of aiming pattern 1262 during one or more exposure periods, e.g., one or more exposure period 5220-5230.

In the case of apparatus 1000 (e.g. by CPU 1060) performing image processing algorithms for detection of spatial patterns, such as patterns indicative of a smart phone being in the field of view of apparatus 1000 and light patterns, apparatus 100 can perform a variety of pattern recognition algorithms, including edge detection methods, grey level segmentation, digital morphology, thinning and texture algorithms.

In one example, the sensed condition resulting in a configuration switch as explained with reference to the timelines of 5110 and 5112 can be the brightness level of a captured frame (e.g. one or more frames having exposure periods 5220, 5222, 5224) being below a low threshold or above a high threshold. In the development of apparatus 1000 it was determined that capturing frames corresponding to a display can result in either light being transmitted through the display resulting in low brightness levels below a low threshold or light being reflected specularly from a display resulting in high brightness levels above high threshold. Thus, it was determined that a detection of either a low brightness level below a low threshold or a high brightness level above a high threshold can provide a detection of a display equipped apparatus being in a field of view of apparatus 1000.

In one example, the sensed condition resulting in a configuration switch as explained with reference to the timelines of 5110 and 5112 can be an infrared energy level. In the development of apparatus 1000, it was determined that a target terminal 2000 in proximity with apparatus 1000 can emit infrared energy above a threshold. Accordingly, a processing of a frame of image data for detection of infrared energy above the threshold can be regarded as a detection of a target terminal 2000 in proximity of apparatus 1000. For detection of infrared energy, image sensor array 1033 can be provided to be sensitive to infrared energy.

Figure 8:
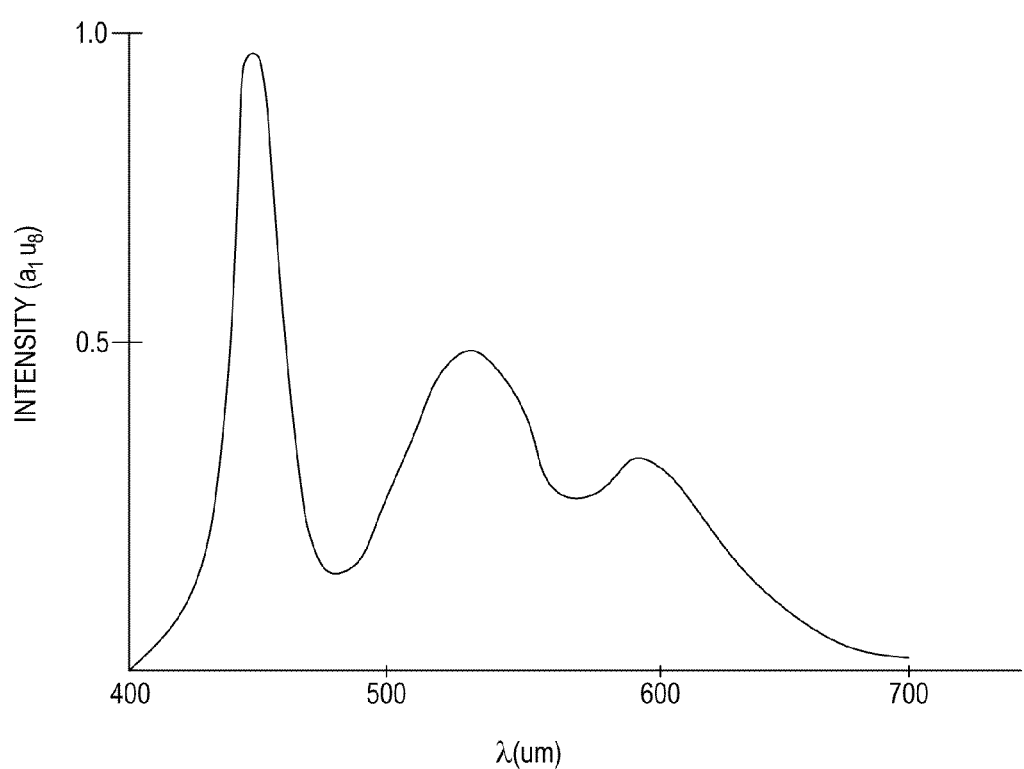
FIG. 8 is an emission profile of a representative display backlight.

In one example, the sensed condition resulting in a configuration switch as explained with reference to the timelines of 5110 and 5112 can be a color emission profile of a captured frame (e.g. one or more captured frames having one or more of exposure periods 5220, 5222 and 5224). In the development of apparatus 1000 it was determined that a backlight of a display 2222 of a target terminal 2000 (FIG. 1) typically has an emission profile indicated in FIG. 8 with separate peaks in the red green and blue wavelength bands. Accordingly it was determined that a detection of a display equipped apparatus being in a field of view of apparatus can be yielded by a processing of image data to determination that captured frame (e.g. a frame or frames having one or more exposure periods 5220, 5222, 5224) has an emission profile corresponding to the signature characteristic of having respective peaks in the red green and blue wavelength bands as indicated in FIG. 8. Apparatus 1000 for such functionality can include an image sensor array 1033 provided by a color image sensor array.

In one example, the sensed condition resulting in a configuration switch as explained with reference to the timelines of 5110 and 5112 can be a detection by processing of a captured frame (e.g. one or more captured frames having one or more of exposure periods 5220, 5222, 5224) to determine that one or more captured frame includes a representation of a certain type of bar code symbol. In the development apparatus 1000 it was determined that certain types of bar code symbologies, e.g. the symbologies DATAMATRIX AND QR CODE are finding increased incidence of use in display reading applications. Accordingly attention of a presence of a bar code symbology having a signature symbology type indicating use in a display reading apparatus can be regarded as a determination that a display equipped apparatus is in the field of view of an apparatus 1000.

In one example, the sensed condition resulting in a configuration switch as explained with reference to the timelines of 5110 and 5112 can be a detection by apparatus 1000 that a radio equipped apparatus 1000 has been moved proximate apparatus 1000. For example apparatus 1000 can include a wireless communication interface 1250 that is based on a short range wireless communication technology. In one embodiment, interface 1250 can be provided by a Bluetooth wireless communication interface. In the development of apparatus 1000 it was determined that a display equipped apparatus displaying indicia to be read by apparatus 1000 can also include a short range radio transceiver wireless communication interface capable of being in communication with wireless communication interface 1250. Accordingly, in the development of apparatus 1000 it was determined that a detection by processing signals received by apparatus 1000 via wireless communication interface 1250 can serve as a determination that a display equipped target terminal 2000 is proximate apparatus 1000. Wireless communication interfaces are commonly configured to send out beacon signals receivable and processable by neighboring wireless communication interfaces of the common technology. Accordingly, a receipt and processing by apparatus 1000 via wireless communication interface 1250 of a wireless signal transmitted by target terminal 2000 provides knowledge to apparatus 1000 that a neighboring wireless communication interface equipped terminal, i.e., target terminal 2000 is at a proximate location proximate apparatus 1000.

It will be seen that apparatus 1000 can be adapted so that with Configurations A and C active herein frames captured representative of backlit displays can be expected to have higher average signal to noise ratios than frames representative of paper substrates. As indicated, light rays directed to a display tend to be transmitted through a display or alternatively tend to be specularly reflected. With Configuration B active herein frames captured representative of paper substrates can be expected to have higher average signal to noise ratios than frames representative of backlit displays. As indicated, light rays directed to a paper substrate tend to be reflected to provide diffuse return light that can be sensed by image sensor array 1033 for output of a processable signal. There is set forth herein an indicia reading apparatus comprising: an illumination assembly for projection of an illumination pattern, the illumination assembly having one or more light source; an imaging assembly including an image sensor array and an imaging lens assembly for focusing an image of a target onto the image sensor array; wherein the indicia reading apparatus is operative in a first configuration and a second configuration; wherein the indicia reading apparatus is adapted so that one or more frame captured with the first configuration active have higher average signal to noise ratios when the one or more frames represent a first test substrate than when the one or more frame represents a second test substrate; wherein the indicia reading apparatus is adapted so that one or more frame captured with the second configuration active have higher average signal to noise ratios when the one or more frame represent the second test substrate than when the one or more frame represents a first test substrate; wherein the indicia reading apparatus is operative to deactivate the first configuration and activate the second configuration responsively to a sensed condition. In one example, the first test substrate is provided by standard white copy paper, and in one particular example is provided by FLAGSHIP™ copy paper provided by WB Mason Co. Inc. In one example, the second test substrate is provided by a backlit display that displays a decodable indicia with a white background. In one particular example the second test substrate is provided by a backlit display of an IPHONE 4™ smart phone provided by Apple Inc.

A signal processing by apparatus 1000 of image data frame read out from image sensor array 1033 or a signal received by wireless communication interface 1250 can result in activation of a configuration change within a trigger signal activation period as is indicated by timeline 5110 and timeline 5112. A signal processing by apparatus 1000 of image data readout from image sensor array 1033 or of a signal received by wireless communication interface 1250 can result in activation of a configuration change prior to a trigger signal activation. That is, in one embodiment, prior to activation of trigger signal 5002 apparatus 1000 can activate configuration A or C responsively to a detection by a processing of a frame of image data or a processing of a signal output by image sensor array 1033 or received by wireless communication interface 1250 by wireless interface 1250 that another wireless interface apparatus is proximate to apparatus 1000.

A small sample of systems methods and apparatus that are described herein is as follows:

A1. An indicia reading apparatus comprising:
 an illumination assembly for projection of an illumination pattern, the illumination assembly having one or more light source;
 an imaging assembly including an image sensor array and an imaging lens assembly for focusing an image of a target onto the image sensor array;
 wherein the indicia reading apparatus is operative in accordance with a first configuration;
 wherein the indicia reading apparatus with the first configuration active is operative so that responsively to the trigger signal activation the indicia reading apparatus captures a first frame and a second frame, the second frame being captured subsequent to the first frame, wherein the indicia reading apparatus with the first configuration active is further operative so that the illumination assembly is de-energized during an exposure period of the first frame, de-energized during an exposure period of the second frame, and energized during a period intermediate of an exposure period of the first frame and an exposure period of the second frame, wherein the indicia reading apparatus with the first configuration active is further operative so that the indicia reading apparatus attempts to decode a decodable indicia by processing of each of the first frame and the second frame.

A2. The indicia reading apparatus of A1, wherein the first configuration is a fixed configuration so that the indicia reading apparatus is restricted from operating in manner other than in accordance with the first configuration.

A3. The indicia reading apparatus of A1, wherein the apparatus is operative in accordance with a second configuration, wherein the indicia reading apparatus with the second configuration active is operative so that responsively to the trigger signal activation the indicia reading apparatus captures a first frame and a second frame, the second frame being captured subsequent to the first frame, wherein the indicia reading apparatus with the second configuration active is further operative so that the illumination assembly is de-energized during an exposure period of the first frame captured with the second configuration active, de-energized during an exposure period of the second frame captured with the second configuration active, and is maintained de-energized for the period intermediate of an exposure period of the first frame and an exposure period of the second frame, wherein the indicia reading apparatus with the second configuration active is further operative so that the indicia reading apparatus attempts to decode a decodable indicia by processing of each of the first frame and the second frame captured with the second configuration active.

A4. The indicia reading apparatus of A1, wherein the apparatus is operative in accordance with a second configuration, wherein the indicia reading apparatus with the second configuration active is operative so that responsively to the trigger signal activation the indicia reading apparatus captures a first frame and a second frame, the second frame being captured subsequent to the first frame, wherein the indicia reading apparatus with the second configuration active is further operative so that the illumination assembly is energized during an exposure period of the first frame captured with the second configuration active, energized during an exposure period of the second frame captured with the second configuration active, and is maintained de-energized for the period intermediate of an exposure period of the first frame and an exposure period of the second frame, wherein the indicia reading apparatus with the second configuration active is further operative so that the indicia reading apparatus attempts to decode a decodable indicia by processing of each of the first frame and the second frame captured with the second configuration active.

A5. The indicia reading apparatus of A3, wherein the apparatus is operative in accordance with a third configuration, wherein the indicia reading apparatus with the third configuration active is operative so that responsively to the trigger signal activation the indicia reading apparatus captures a first frame and a second frame, the second frame being captured subsequent to the first frame, wherein the indicia reading apparatus with the third configuration active is further operative so that the illumination assembly is energized during an exposure period of the first frame captured with the third configuration active, energized during an exposure period of the second frame captured with the third configuration active, and is maintained de-energized for the period intermediate of an exposure period of the first frame and an exposure period of the second frame, wherein the indicia reading apparatus with the third configuration active is further operative so that the indicia reading apparatus attempts to decode a decodable indicia by processing of each of the first frame and the second frame captured with the second configuration active.

A6. The indicia reading apparatus of A1, wherein the indicia reading apparatus is operative so that for subsequent illumination periods an energy level of emitted light for projection of the illumination pattern is increased.

A7. The indicia reading apparatus of A1, wherein the indicia reading apparatus is operative so that for subsequent illumination periods that are intermediate of exposure periods, an energy level of emitted light for projection of the illumination pattern is increased, wherein the indicia reading apparatus is further operative so that the indicia reading apparatus processes image data captured by the indicia reading apparatus for detection of a mode change of a target terminal A8. The indicia reading apparatus of A1, wherein the indicia reading apparatus is operative so that for subsequent illumination periods that are intermediate of exposure periods, an energy level of emitted light for projection of the illumination pattern is increased, wherein the indicia reading apparatus is further operative so that the indicia reading apparatus processes image data captured by the indicia reading apparatus for detection of a mode change of a target terminal, wherein the indicia reading apparatus is further operative so that the indicia reading apparatus maintains the energy level of the emitted light for projection of the illumination pattern at a sufficient level so that operation of the target terminal in a high brightness mode is maintained.

A9. The indicia reading apparatus of A1, wherein the indicia reading apparatus is operative to emit energy at an energy level sufficient to induce a mode change from a first mode to a second mode in a target terminal displaying decodable indicia to be read, wherein the indicia reading terminal is further operative to detect whether the mode change has been induced, and wherein the indicia reading terminal is further operative to regulate an energy level of energy emitted by the indicia reading apparatus so that the second mode is maintained in the active state.

B1. An indicia reading apparatus comprising:
an illumination assembly for projection of an illumination pattern, the illumination assembly having one or more light source;
an imaging assembly including an image sensor array and an imaging lens assembly for focusing an image of a target onto the image sensor array;
wherein the indicia reading apparatus is operative in a first configuration and a second configuration;
wherein the indicia reading apparatus, with the first configuration active is operative to capture one or more frame for subjecting to a decode attempt, the one or more frame for subjecting to a decode attempt being captured with the illumination assembly for projecting an illumination pattern being energized during exposure periods of the one or more frame;
wherein the indicia reading apparatus with the second configuration active is operative to capture one or more frame for subjecting to a decode attempt, the one or more frame for subjecting to a decode attempt being captured with the illumination assembly for projecting an illumination pattern being restricted from being energized during exposure periods of the one or more frame;
wherein the indicia reading apparatus is operative to deactivate the first configuration and activate the second configuration responsively to a sensed condition.

B2. The indicia reading apparatus of B1, wherein the sensed condition is the detection of a display equipped apparatus in the field of view of the imaging assembly by processing of one or more frame captured by the apparatus for recognition of one or more spatial patterns indicative of a display equipped apparatus.

B3. The indicia reading apparatus of B1, wherein the sensed condition is the detection of display equipped apparatus in the field of view of the imaging assembly by processing of one or more frames captured by the apparatus for recognition of one or more spatial pattern indicative of light pattern being projected on a display.

B4. The indicia reading apparatus of B1, wherein the sensed condition is the detection of an infrared energy level above a threshold.

B5. The indicia reading apparatus of B1, wherein the sensed condition is the detection of display equipped apparatus in the field of view of the imaging assembly by processing of one or more frame captured by the apparatus for determining whether a brightness level of the one or more frames exceeds a high threshold or falls below a low threshold.

B6. The indicia reading apparatus of B1, wherein the sensed condition is the detection of a display equipped apparatus in the field of view of the imaging assembly by processing of one or more frame captured by the apparatus for determining that a color emission profile of the one or more frames corresponds to a signature profile of a backlight display.

B7. The indicia reading apparatus of B1, wherein the sensed condition is the detection of a display equipped apparatus proximate the indicia reading apparatus by processing of radio signals output by a wireless communication interface of the indicia reading apparatus.

B8. The indicia reading apparatus of B1, wherein the indicia reading apparatus with the second configuration active energizes the illumination assembly during one or more periods offset from the one or more exposure periods of the one or more frames captured with the second configuration active.

B9. The indicia reading apparatus of any of B1 through B8, wherein the indicia reading apparatus, with the first configuration active is operative to capture two or more frames for subjecting to a decode attempt, the two or more frames for subjecting to a decode attempt being captured with the illumination assembly for projecting an illumination pattern being energized during exposure periods of the two or more frames; wherein the indicia reading apparatus with the second configuration active is operative to capture two or more frames for subjecting to a decode attempt, the two or more frames for subjecting to a decode attempt being captured with the illumination assembly for projecting an illumination pattern being restricted from being energized during exposure periods of the two or more frames.

C1. An indicia reading apparatus comprising:
an illumination assembly for projection of an illumination pattern, the illumination assembly having one or more light source;
an imaging assembly including an image sensor array and an imaging lens assembly for focusing an image of a target onto the image sensor array;
wherein the indicia reading apparatus is operative in a first configuration and a second configuration;
wherein the indicia reading apparatus is adapted so that one or more frame captured with the first configuration active have higher average signal to noise ratios when the one or more frame represent a first test substrate than when the frames represent on a second test substrate;
wherein the indicia reading apparatus is adapted so that one or more frame captured with the second configuration active have higher average signal to noise ratios when the one or more frame represent the second test substrate than when the frames represent the first test substrate;

wherein the indicia reading apparatus is operative to deactivate the first configuration and activate the second configuration responsively to a sensed condition.

C2. The indicia reading apparatus of C1, wherein the sensed condition is the detection of display equipped apparatus in the field of view of the imaging assembly sensed by processing of one or more frames captured by the apparatus for recognition of one or more spatial pattern indicative of a display equipped apparatus.

C3. The indicia reading apparatus of C1, wherein the sensed condition is the detection of a display equipped apparatus in the field of view of the imaging assembly by processing of one or more frame captured by the apparatus for recognition of one or more spatial pattern indicative of a light pattern being projected on a display.

C4. The indicia reading apparatus of C1, wherein the sensed condition is the detection of display equipped apparatus in the field of view of the imaging assembly by processing of one or more frame captured by the apparatus for determining whether a brightness level of the one or more frames exceeds a high threshold or falls below a low threshold.

C5. The indicia reading apparatus of C1, wherein the sensed condition is the detection of an infrared energy level above a threshold.

C6. The indicia reading apparatus of C1, wherein the sensed condition is the detection of display equipped apparatus in the field of view of the imaging assembly by processing of one or more frame captured by the apparatus for determining that a color emission profile of the one or more frames corresponds to a signature profile of a backlight display.

C7. The indicia reading apparatus of C1, wherein the sensed condition is the detection of a display equipped apparatus proximate the indicia reading apparatus by processing of radio signals output by a wireless communication interface of the indicia reading apparatus.

C8. The indicia reading apparatus of C1, wherein the indicia reading apparatus with the second configuration active energizes the illumination assembly during one or more periods offset from the one or more exposure periods of the one or more frames captured with the second configuration active.

C9. The indicia reading apparatus of C1, wherein the first test substrate is provided by white copy paper and the second test substrate is provided by a backlit display.

D1. An indicia reading apparatus comprising:
an imaging assembly including an image sensor array and an imaging lens assembly for focusing an image of a target onto the image sensor array;
wherein the indicia reading apparatus is operative to capture a first frame and to subject the first frame to an attempt to decode decodable indicia;
wherein the indicia reading apparatus is operative to emit energy at an energy level sufficient to induce a mode change from a first mode to a second mode in a target terminal displaying decodable indicia to be read, wherein the indicia reading apparatus is further operative to detect whether the mode change has been induced, and wherein the indicia reading apparatus is further operative to regulate the energy level of energy emitted by the indicia reading apparatus so that the second mode is maintained in the active state.

D2. The indicia reading apparatus of D1, wherein the indicia reading apparatus includes an illumination assembly for projection of an illumination pattern, the illumination assembly having one or more light source, wherein the energy emitted by the indicia reading apparatus includes light energy emitted by the illumination assembly.

While the present invention has been described with reference to a number of specific embodiments, it will be understood that the true spirit and scope of the invention should be determined only with respect to claims that can be supported by the present specification. Further, while in numerous cases herein wherein systems and apparatuses and methods are described as having a certain number of elements it will be understood that such systems, apparatuses and methods can be practiced with fewer than or greater than the mentioned certain number of elements. Also, while a number of particular embodiments have been described, it will be understood that features and aspects that have been described with reference to each particular embodiment can be used with each remaining particularly described embodiment.

The invention claimed is:

1. An indicia reading apparatus comprising:
an illumination assembly for projecting an illumination pattern, the illumination assembly comprising a light source;
a wireless communication interface; and
an imaging assembly comprising (i) an image sensor array and (ii) an imaging lens assembly for focusing an image of a target within a field of view onto the image sensor array;
wherein the indicia reading apparatus, when in a first configuration, is configured for:
capturing a frame representing a first test substrate; and
capturing a frame representing a second test substrate;
wherein the frame representing the first test substrate has a higher average signal to noise ratio than the average signal to noise ratio of the frame representing the second test substrate;
wherein the indicia reading apparatus, when in a second configuration, is configured for:
capturing a frame representing the first test substrate; and
capturing a frame representing the second test substrate;
wherein the frame representing the second test substrate has a higher average signal to noise ratio than the average signal to noise ratio of the frame representing the first test substrate;
wherein the indicia reading apparatus is configured for:
sensing a condition; and
in response to the sensed condition, deactivating the first configuration and activating the second configuration; and
wherein sensing a condition comprises processing a captured frame to determine whether the captured frame's color emission profile corresponds to a signature profile of a backlight display; and
wherein sensing a condition comprises processing radio signals output by the wireless communication interface to determine if a display equipped apparatus is proximate the indicia reading apparatus.

2. The indicia reading apparatus of claim 1, wherein sensing a condition comprises processing a captured frame to detect a display in the field of view.

3. The indicia reading apparatus of claim 1, wherein sensing a condition comprises processing a captured frame in an effort to recognize a spatial pattern indicative of a light pattern on a display in the field of view.

4. The indicia reading apparatus of claim 1, wherein sensing a condition comprises processing a captured frame to determine whether the captured frame's brightness level exceeds a high threshold or falls below a low threshold.

5. The indicia reading apparatus of claim 1, wherein sensing a condition comprises detecting whether an infrared energy level is above a threshold.

6. The indicia reading apparatus of claim 1, wherein the indicia reading apparatus, when in a second configuration, is configured for:
  capturing a succession of frames using an exposure period; and
  energizing the illumination assembly during a period offset from the exposure period of the succession of frames.

7. The indicia reading apparatus of claim 1, wherein the first test substrate is white copy paper and the second test substrate is a backlit display.

8. An indicia reading apparatus comprising:
  an illumination assembly for projection of an illumination pattern, the illumination assembly having one or more light sources;
  a wireless communication interface; and
  an imaging assembly including an image sensor array and an imaging lens assembly for focusing an image of a target onto the image sensor array;
  wherein the indicia reading apparatus is operative in a first configuration and a second configuration;
  wherein the indicia reading apparatus is adapted so that one or more frames captured with the first configuration active have higher average signal to noise ratios when the one or more frames represent a first test substrate than when the frames represent a second test substrate;
  wherein the indicia reading apparatus is adapted so that one or more frames captured with the second configuration active have higher average signal to noise ratios when the one or more frames represent the second test substrate than when the frames represent the first test substrate;
  wherein the indicia reading apparatus is operative to deactivate the first configuration and activate the second configuration responsively to a sensed condition; and
  wherein the sensed condition comprises the detection of a display equipped apparatus in the field of view of the imaging assembly by processing of one or more frames captured by the apparatus for determining that a color emission profile of the one or more frames corresponds to a signature profile of a backlight display; and
  wherein the sensed condition comprises the detection of a display equipped apparatus proximate the indicia reading apparatus by processing of radio signals output by the wireless communication interface.

9. The indicia reading apparatus of claim 8, wherein the sensed condition comprises the detection of a display equipped apparatus in the field of view of the imaging assembly sensed by processing of one or more frames captured by the apparatus for recognition of one or more spatial patterns indicative of a display equipped apparatus.

10. The indicia reading apparatus of claim 8, wherein the sensed condition comprises the detection of a display equipped apparatus in the field of view of the imaging assembly by processing of one or more frames captured by the apparatus for recognition of one or more spatial patterns indicative of a light pattern being projected on a display.

11. The indicia reading apparatus of claim 8, wherein the sensed condition comprises the detection of a display equipped apparatus in the field of view of the imaging assembly by processing of one or more frames captured by the apparatus for determining whether a brightness level of the one or more frames exceeds a high threshold or falls below a low threshold.

12. The indicia reading apparatus of claim 8, wherein the sensed condition comprises the detection of an infrared energy level above a threshold.

13. The indicia reading apparatus of claim 8, wherein the indicia reading apparatus with the second configuration active energizes the illumination assembly during one or more periods offset from the one or more exposure periods of the one or more frames captured with the second configuration active.

14. The indicia reading apparatus of claim 8, wherein the first test substrate is provided by white copy paper and the second test substrate is provided by a backlit display.

* * * * *